US010461627B2

(12) United States Patent
Radic

(10) Patent No.: US 10,461,627 B2
(45) Date of Patent: Oct. 29, 2019

(54) FRACTIONAL VALLEY SWITCHING CONTROLLER

(71) Applicant: Silanna Asia Pte Ltd, Singapore (SG)

(72) Inventor: Aleksandar Radic, Toronto (CA)

(73) Assignee: Silanna Asia Pte Ltd, Singapore (SG)

( * ) Notice: Subject to any disclaimer, the term of this patent is extended or adjusted under 35 U.S.C. 154(b) by 0 days.

(21) Appl. No.: 16/269,931

(22) Filed: Feb. 7, 2019

(65) Prior Publication Data
US 2019/0252966 A1    Aug. 15, 2019

Related U.S. Application Data

(60) Provisional application No. 62/630,639, filed on Feb. 14, 2018.

(51) Int. Cl.
*H02M 1/08* (2006.01)
*H02M 3/335* (2006.01)

(52) U.S. Cl.
CPC ......... *H02M 1/08* (2013.01); *H02M 3/33592* (2013.01)

(58) Field of Classification Search
CPC .......... H02M 1/08; H02M 1/088; H02M 1/32; H02M 3/335; H02M 3/33507; H02M 3/33546; H02M 3/33592
See application file for complete search history.

(56) References Cited

U.S. PATENT DOCUMENTS

| 5,173,846 A | 12/1992 | Smith |
| 5,206,800 A | 4/1993 | Smith |
| 5,434,767 A | 7/1995 | Batarseh et al. |
| 5,636,106 A | 6/1997 | Batarseh et al. |
| 6,341,073 B1 | 1/2002 | Lee |
| 6,421,256 B1 | 7/2002 | Giannopoulos et al. |
| 7,876,085 B2 * | 1/2011 | Hung ................. G01R 19/0084 324/102 |
| 8,259,471 B2 * | 9/2012 | Li ...................... H02M 3/33507 363/21.12 |
| 8,339,817 B2 | 12/2012 | Halberstadt |

(Continued)

FOREIGN PATENT DOCUMENTS

| KR | 20130054212 A | 5/2013 |
| KR | 20130105537 A | 9/2013 |
| WO | WO-2017074305 A1 * | 5/2017 .............. H02M 1/44 |

OTHER PUBLICATIONS

Office Action dated Mar. 6, 2019 for U.S. Appl. No. 16/020,496.
International Search Report dated May 21, 2019 for PCT Patent Application No. PCT/IB2019/051092.

*Primary Examiner* — Matthew V Nguyen
(74) *Attorney, Agent, or Firm* — MLO, a professional corp.

(57) ABSTRACT

A power converter controller includes a fractional valley controller configured to determine a target number of valleys of a resonant waveform at a drain node of a main switch, the target number of valleys corresponding to a desired off-time of the main switch, the fractional valley controller modulating an off-time of the main switch between two or more modulated off-times. The target number of valleys corresponds to a non-integer number of valleys of the resonant waveform at the drain node of the main switch. Each of the modulated off-times of the main switch corresponds to an integer number of valleys, and the two or more modulated off-times of the main switch has an average value that corresponds to the desired off-time.

21 Claims, 10 Drawing Sheets

(56) References Cited

U.S. PATENT DOCUMENTS

| | | | |
|---|---|---|---|
| 8,552,893 B1 | 10/2013 | Sood et al. | |
| 8,659,237 B2 | 2/2014 | Archenhold | |
| 8,659,915 B2 * | 2/2014 | Tsui | H02M 3/33523 |
| | | | 363/21.02 |
| 8,755,203 B2 | 6/2014 | Li et al. | |
| 9,083,250 B2 | 7/2015 | Adragna | |
| 9,154,030 B2 | 10/2015 | Bianco et al. | |
| 9,825,535 B2 | 11/2017 | Teo et al. | |
| 9,991,791 B2 | 6/2018 | Herfurth et al. | |
| 10,224,828 B1 * | 3/2019 | Sigamani | H02M 3/33592 |
| 2008/0112193 A1 | 5/2008 | Yan et al. | |
| 2009/0296429 A1 | 12/2009 | Cook et al. | |
| 2010/0026208 A1 | 2/2010 | Shteynberg et al. | |
| 2011/0031949 A1 | 2/2011 | Zhang et al. | |
| 2011/0182089 A1 | 7/2011 | Berghegger | |
| 2012/0039098 A1 | 2/2012 | Berghegger | |
| 2014/0268913 A1 | 9/2014 | Zheng et al. | |
| 2015/0103566 A1 | 4/2015 | Keogh et al. | |
| 2015/0155786 A1 | 6/2015 | Shen et al. | |
| 2015/0229200 A1 | 8/2015 | Schwartz | |
| 2015/0249389 A1 | 9/2015 | Cummings | |
| 2017/0085183 A1 | 3/2017 | Notsch | |
| 2018/0153013 A1 | 5/2018 | Halim et al. | |
| 2018/0269793 A1 | 9/2018 | Ahsanuzzaman et al. | |
| 2019/0058450 A1 * | 2/2019 | Jun | H03H 7/18 |

\* cited by examiner

FRACTIONAL VALLEY SWITCHING CONTROLLER

RELATED APPLICATIONS

The application claims the benefit of U.S. Provisional Patent Application No. 62/630,639 filed on Feb. 14, 2018, and entitled "Fractional Valley Switching Controller," and is related to U.S. patent application Ser. No. 16/020,496 filed on Jun. 27, 2018, and entitled "Switch-Mode Power Supply Controller"; all of which are hereby incorporated by reference in their entirety for all purposes.

BACKGROUND

Switch-mode power supplies (SMPSs) ("power converters") are widely utilized in consumer, industrial and medical applications to provide well-regulated power while maintaining high power processing efficiency, tight-output voltage regulation, and reduced conducted and radiated electromagnetic interference (EMI).

To meet these conflicting goals, state-of-the-art power converters (fly-back converters, forward converters, boost converters, buck converters, and so on) commonly utilize quasi-resonant control methods. Quasi-resonant control methods induce a resonant waveform having sinusoidal voltage oscillations at the drains of one or more semiconductor switches of the power converter. Through well-timed control actions, the semiconductor switches are turned on at the instants where the drain voltage is minimum (i.e., valley switching), thus minimizing the semiconductor switching losses and drain-source dv/dt slope, leading to increased power processing efficiency and reduced electromagnetic interference (EMI).

To maintain these benefits across an entire operating range of the power converter, it is often necessary to "hop" between the valleys of the resonant waveform in such a way as to minimize the sum of the conduction and switching losses (which are generally inversely proportional to each other). However, during the valley hop transitions, output voltage disturbances are introduced. Furthermore, if there are frequent and/or repeated low-frequency mode transitions, audible noise may be generated by the magnetic and/or capacitive elements of the power converter.

Typically, this issue is partially addressed by introducing large valley hopping hysteresis constraints. However, such methods negatively affect power processing efficiency and eliminate any potential spread-spectrum benefits from more frequent valley hopping. In addition, a large output voltage disturbance is still introduced as a result of such valley mode transitions.

SUMMARY

Some embodiments described herein provide a power converter controller that includes a fractional valley controller configured to determine a target number of valleys of a resonant waveform at a drain node of a main switch, the target number of valleys corresponding to a desired off-time of the main switch, the fractional valley controller modulating an off-time of the main switch between two or more modulated off-times. The target number of valleys corresponds to a non-integer number of valleys of the resonant waveform at the drain node of the main switch. Each of the modulated off-times of the main switch corresponds to an integer number of valleys, and the two or more modulated off-times of the main switch has an average value that corresponds to the desired off-time.

Some embodiments described herein provide a power converter that includes a transformer having a primary winding configured to receive an input voltage, and a secondary winding configured to provide an output voltage to a load. A main switch is coupled to the primary winding and configured to control a current through the primary winding to generate the output voltage. A resonant waveform at a drain node of the main switch includes one or more valleys during an off-time of the main switch. The power converter includes a primary side controller configured to control the main switch. The primary side controller includes a fractional valley controller configured to control the off-time of the main switch. The fractional valley controller is configured to determine a target number of valleys corresponding to a desired off-time of the main switch, the target number of valleys corresponding to a non-integer number of valleys. The fractional valley controller is configured to modulate the off-time of the main switch between two or more modulated off-times, each of the modulated off-times of the main switch corresponding to a respective integer number of valleys of the resonant waveform, and the two or more modulated off-times of the main switch has an average value that corresponds to the desired off-time.

DETAILED DESCRIPTION

Some embodiments described herein provide a fractional valley switching controller of a switch-mode power supply ("power converter") that implements fractional valley switching during a quasi-resonant operating mode of the power converter. In some embodiments, the fractional valley switching controller ("fractional valley controller") is part of a primary side controller of the power converter. In general, the power converter converts an input voltage on a primary side of a transformer to an output voltage on a secondary side of the transformer by controlling a current through a primary winding of the transformer using a primary side switch ("main switch"). During an off-time of the main switch, a resonant waveform develops at the drain node of the main switch. Based on the off-time of the main switch, the resonant waveform includes one or more peaks (local maxima) and one or more valleys (local minima). The primary side controller of the power converter is configured to control the off-time of the main switch such that the main switch is typically only switched when the drain-source voltage of the main switch is at a local minimum (i.e., at a valley of the resonant waveform). Unfortunately, in some instances, a total power to be delivered by the power converter can correspond to a non-integer number of valleys. Because a non-integer valley number does not correspond to a local minimum of the resonant waveform, switching the main switch at a non-integer valley number will result in switching losses that are greater than if the main switch is switched when the drain-source voltage is at a local minimum (i.e., corresponding to an integer number of valleys). The fractional valley switching controller disclosed herein advantageously controls, by fractional valley switching, the off-time of the main switch such that the main switch is typically only switched at integer valleys but enables the power converter to still deliver a total power that corresponds to a non-integer number of valleys. As is disclosed herein, such fractional valley switching is accomplished by the fractional valley controller by modulating a series of off-times of the main switch, each of the modulated off-times corresponding to a respective integer number of valleys. An average of the modulated off-times converges to an off-time that corresponds to a non-integer (i.e., fractional) valley. Thus, advantageously, a precise amount of power is delivered by the power converter, and switching losses are still minimized. Additionally, the fractional valley controller disclosed herein advantageously enables or disables fractional valley switching based on a switching cycle frequency of the main switch to prevent undesirable audible tones. Still further, the fractional valley controller disclosed herein provides for a fractional resolution of the non-integer number of valleys that is greater than that provided by typical valley dithering techniques.

Figure 1:
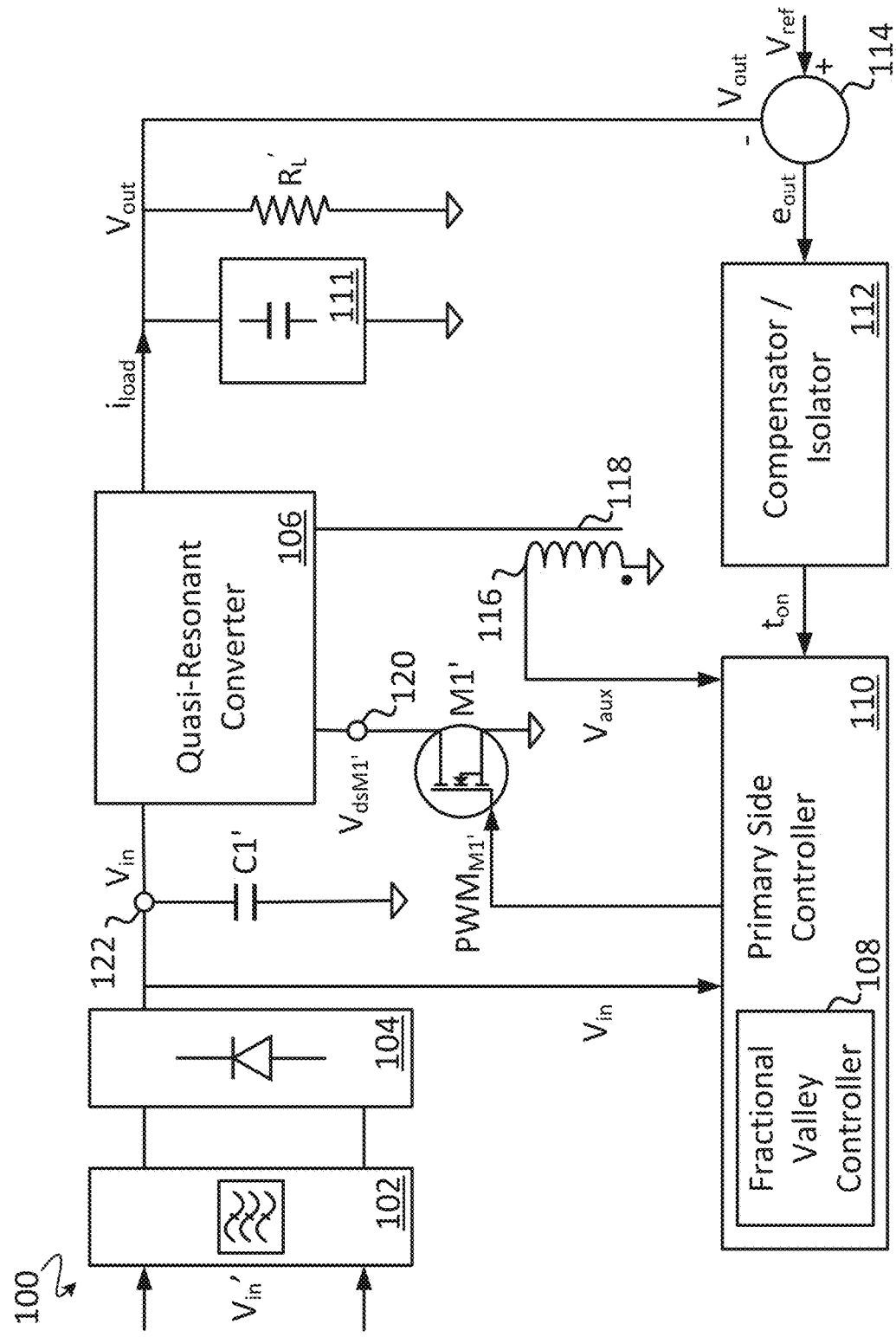
FIG. 1 is a simplified schematic of a power converter that implements fractional valley switching, in accordance with some embodiments.

FIG. 1 is a simplified circuit schematic of a power converter 100, in accordance with some embodiments. Some elements of the power converter 100 have been omitted from FIG. 1 to simplify the description of the power converter 100 but are understood to be present. In general, the power converter 100 includes an input voltage filter block 102, a rectifier block 104 (in the case of AC input), a quasi-resonant converter circuit 106, a fractional valley controller 108 of a primary side controller 110 (a "power converter controller"), an output buffer circuit 111, a compensator/isolator ("feedback network") 112, a signal difference block 114, an auxiliary winding 116 of a transformer 118 of the quasi-resonant converter circuit 106, an input voltage buffer capacitor C1', and a main switch M1', coupled as shown. Also shown is a drain-source voltage $V_{dsM1}'$ of the main switch M1' at a signal node 120, an input voltage $V_{in}'$, a conditioned input voltage $V_{in}$ at a signal node 122, an auxiliary voltage $V_{aux}$, an output voltage $V_{out}$, an output current $i_{load}$, a feedback signal $t_{on}$, an error signal $e_{out}$, and a reference voltage $V_{ref}$.

The power converter 100 is configured to receive the input voltage $V_{in}'$ and to provide the output voltage $V_{out}$ and the output current $i_{load}$ to a load $R_L'$ based on an on-time and an off-time of the main switch M1'. The on-time and the off-time of the main switch M1' are controlled by the primary side controller 110. The primary side controller 110 is configured to receive the input voltage $V_{in}$, the auxiliary voltage $V_{aux}$, and a feedback signal (e.g., a magnetizing inductance charging time $t_{on}$, or other feedback signal) and to generate a main switch control signal $PWM_{M1'}$ to control the on-time and off-time of the main switch M1'. In some embodiments, the quasi-resonant converter circuit 106 is implemented as a fly-back, forward, boost, or buck power converter.

Figure 2:
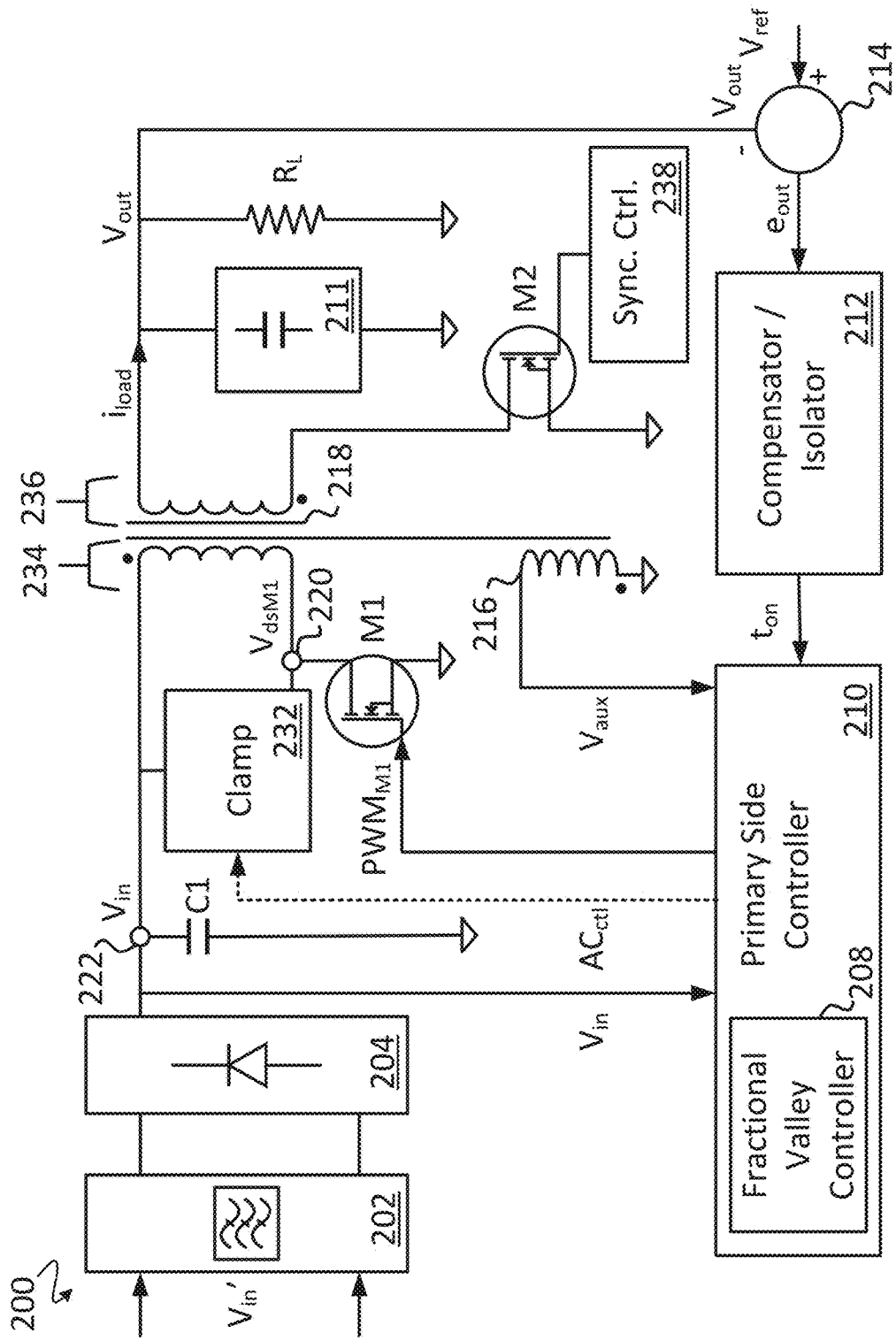
FIG. 2 is a simplified schematic of the power converter of FIG. 1 configured as a fly-back converter, in accordance with some embodiments.

FIG. 2 is a simplified circuit schematic of a power converter 200, in accordance with some embodiments. The power converter 200 is an example embodiment of the power converter 100 when the quasi-resonant converter circuit 106 is implemented as a fly-back converter. Some elements of the power converter 200 have been omitted from FIG. 2 to simplify the description of the power converter 200 but are understood to be present. In general, the power converter 200 includes an input voltage filter block 202, a rectifier block 204 (in the case of AC input), a fractional valley controller 208 of a primary side controller 210 ("a power converter controller"), an output buffer circuit 211, a compensator/isolator ("feedback network") 212, a signal difference block 214, an auxiliary winding 216 of a transformer 218, a clamp circuit 232, a primary winding 234 of the transformer 218 on an input side of the power converter 200, a secondary winding 236 of the transformer 218 on an output side of the power converter 200, a synchronous switch controller 238, an input voltage buffer capacitor C1, a main switch M1, and a synchronous switch M2, coupled as shown. Also shown is a drain-source voltage $V_{dsM1}$ of the main switch M1 at a signal node 220, an input voltage $V_{in}'$, a conditioned input voltage $V_{in}$ at a signal node 222, an optional active clamp control signal $AC_{ctl}$, an auxiliary voltage $V_{aux}$, an output voltage $V_{out}$, an output current $i_{load}$, a feedback signal (e.g., a magnetizing inductance charging time $t_{on}$, or other feedback signal), an error signal $e_{out}$, and a reference voltage $V_{ref}$.

The power converter 200 is configured to receive the input voltage $V_{in}'$ and to provide the output voltage $V_{out}$ and the output current $i_{load}$ to a load $R_L$ based on an on-time and an off-time of the main switch M1. The on-time and the off-time of the main switch M1 are controlled by the primary side controller 210. The primary side controller 210 is configured to receive the input voltage $V_{in}$, an auxiliary voltage $V_{aux}$, and a magnetizing inductance charging time $t_{on}$ (or other feedback signal) and to generate a main switch control signal $PWM_{M1}$ to control the on-time and off-time of the main switch M1.

The main switch M1 is coupled to the primary winding 234 and is configured to control a current through the primary winding 234 to charge a magnetizing inductance of the transformer 218 using the input voltage $V_{in}$ during a first portion of a switching cycle of the power converter 200 (i.e., when the main switch M1 is turned on). The synchronous rectifier switch M2 controls a current through the secondary winding 236 to discharge the transformer 218 into the output buffer circuit 211 and the load $R_L$ during a subsequent portion of the switching cycle (i.e., when the main switch M1 is turned off). The clamp circuit 232 limits the drain-source voltage $V_{dsM1}$ developed at the drain node of the main switch M1 to a voltage that is less than a maximum safe operating voltage of the main switch M1. In some embodiments, the clamp circuit 232 is an active clamp circuit that is self-driven (e.g., the clamp circuit 232 does not require a control signal provided by the primary side controller 210). In other embodiments, the clamp circuit 232 is an active clamp circuit that is controlled by the primary side controller 210 using the optional active clamp control signal $AC_{ctl}$. In still other embodiments, the clamp circuit 232 is a resistor-capacitor-diode (RCD) snubber circuit.

The feedback network 212 generates an internal error signal that is representative of a difference between the output voltage $V_{out}$ at the output of the power converter 200 and the reference voltage $V_{ref}$. In some embodiments, the feedback network 212 processes the difference through an internal proportional-integral (PI) or proportional-integral-differential (PID) compensator. In some embodiments, the output from the feedback network 212 is mirrored from the output side of the power converter 200 to the input side of the power converter 200 using an isolator. The feedback network 212 provides a feedback signal to the primary side controller 210 which adjusts the main switch control signal $PWM_{M1}$ based on the feedback signal. For example, in some embodiments, the feedback signal corresponds to a desired on-time $t_{on}$ for the main switch M1 to charge the magnetizing inductance of the transformer 218.

The primary side controller 210 is configured to receive the feedback signal from the feedback network 212, the input voltage $V_{in}$, and the auxiliary voltage $V_{aux}$, and to generate the main switch control signal $PWM_{M1}$ based on these received signals. The main switch control signal $PWM_{M1}$ causes the main switch M1 to turn on and off in accordance with the on-time and an off-time $t_{off}$ of the main switch M1. During quasi-resonant operation of the power converter 200, when the main switch M1 is off, a resonant waveform develops at a drain node of the main switch M1. The resonant waveform includes a series of voltage peaks (local maxima) and valleys (local minima). The primary side controller 210 advantageously controls the main switch M1 using the main switch control signal $PWM_{M1}$ such that the main switch M1 is turned on when the voltage $V_{dsM1}$ is at a local minimum, i.e., at a valley of the resonant waveform. During a series of switching cycles of the main switch M1, the fractional valley controller 208 modulates the valley at which the main switch M1 is turned on such that an average of the sequence of modulated valleys converges on a non-integer valley number. For example, an integer valley sequence of integer valley numbers: {2, 2, 2, 1} has a non-integer (i.e., fractional) average value of 1.75.

Figure 3:
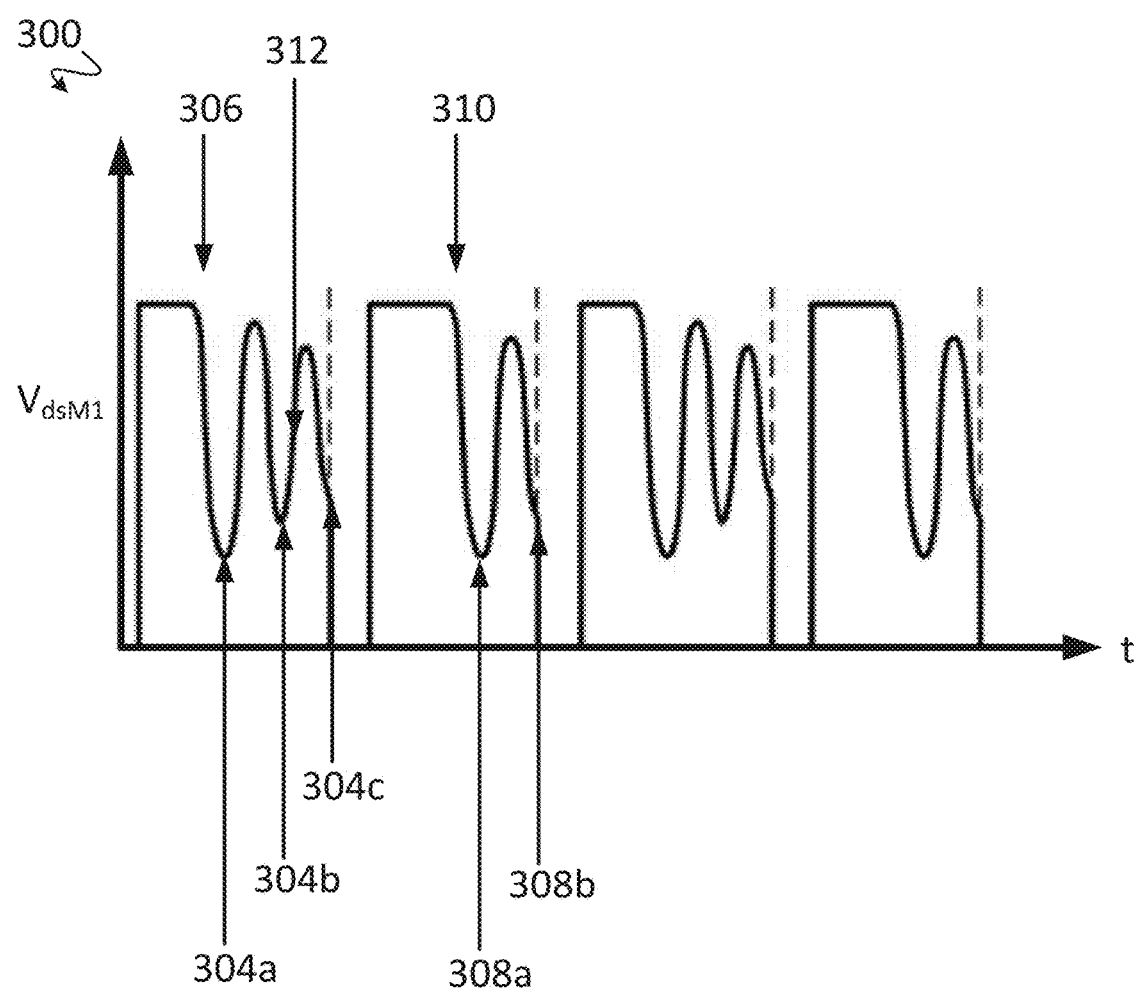
FIG. 3 is a simplified plot of signals related to the power converter shown in FIG. 2, in accordance with some embodiments.

A simplified plot 300 of the drain-source voltage $V_{dsM1}$ (i.e., a resonant waveform), at the drain node of the main switch M1, having integer valleys 304a-c during a first switching cycle 306, and integer valleys 308a-b during a second switching cycle 310 is shown in FIG. 3. By adjusting the off-time of the main switch M1, the primary side controller 210 adjusts a total power ($i_{load}$, $V_{out}$) delivered to the load $R_L$. For example, by adjusting the off-time of the main switch M1 to switch on the third valley 304c of the first switching cycle 306, the primary side controller 210 will cause less power to be delivered to the load $R_L$ than during the second switching cycle 310 during which the main switch M1 is switched on the second valley 308b.

Unfortunately, in some instances, the total power to be delivered to the load $R_L$ will correspond to a non-integer number of valleys (e.g., the point 312). As discussed previously, switching the main switch M1 when the drain-source voltage $V_{dsM1}$ of the main switch M1 is not at a minimum results in switching losses that are greater than if the main switch M1 is switched only when the drain-source voltage $V_{dsM1}$ is at a minimum (i.e., corresponding to an integer number of valleys). Thus, if the main switch M1 is frequently switched at a non-integer number of valleys (e.g., the point 312), switching losses of the power converter 200 will be greater than if the main switch M1 is switched at any of the integer number of valleys (e.g., 304a-c).

The fractional valley controller 208 as disclosed herein advantageously controls, by fractional valley switching, the off-time of the main switch M1 such that the main switch M1 is only switched at an integer number of valleys (i.e., in the middle of one of the valleys) but enables the power converter 200 to still deliver a total power to the load $R_L$ that corresponds to a non-integer number of valleys. Additionally, fractional valley switching as disclosed herein enables such non-integer numbers of valleys to have a greater than typical fractional range. For example, a typical valley dithering approach that dithers or hops between two adjacent valleys may deliver a total power that corresponds to an average between the two adjacent valleys. That is, hopping or dithering between valley 1 (304a) and valley 2 (304b) will converge on an average that corresponds to valley 1.5. However, such typical valley dithering approaches cannot deliver a total power that corresponds to a greater resolution of decimal values between integer valleys (e.g., corresponding to valley 1.25, valley 1.3, valley 1.4, valley 1.45, valley 1.55, and so on).

Figure 4:
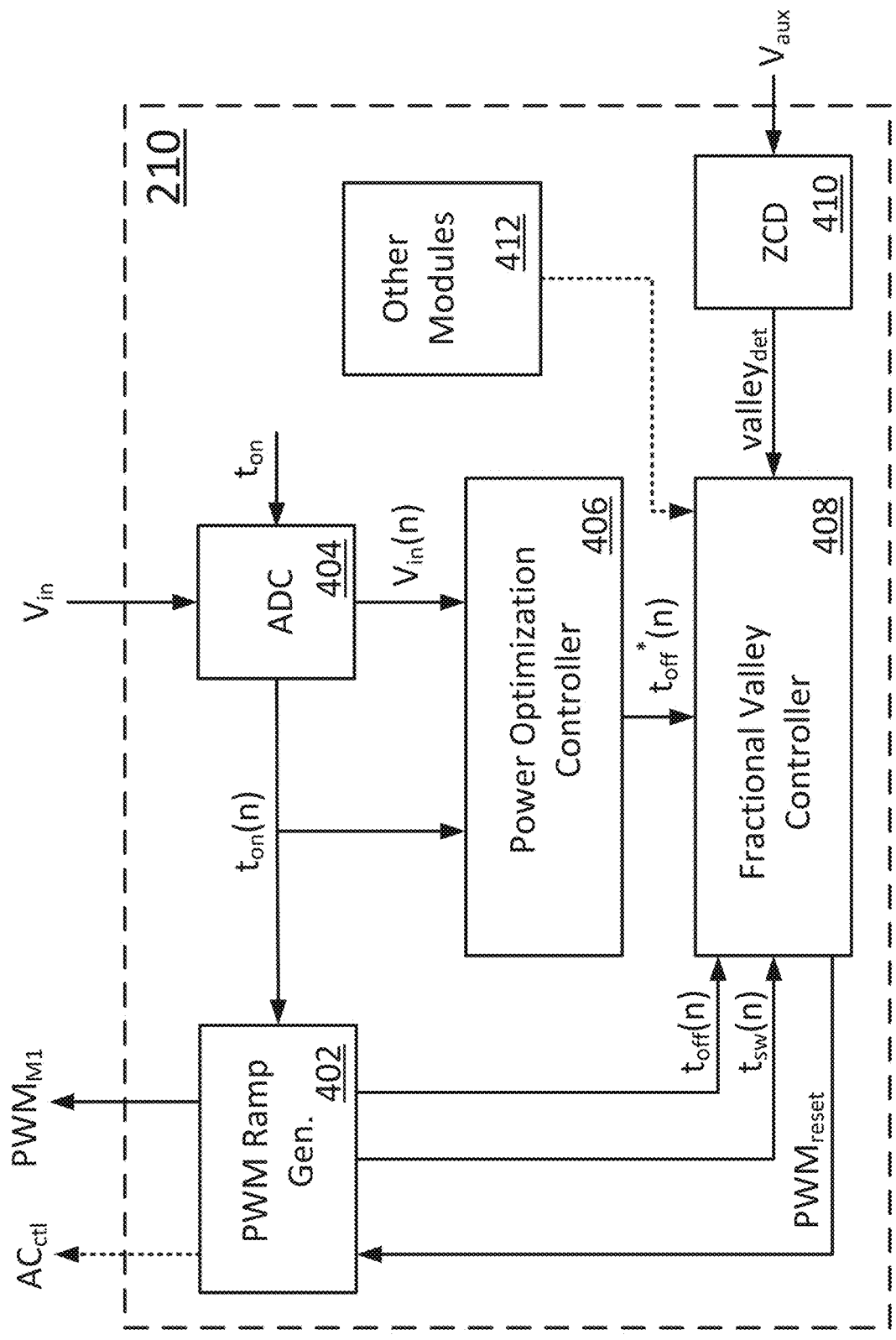
FIG. 4 is a simplified schematic of a primary side controller of the power converter shown in FIG. 2, in accordance with some embodiments.

Details of the primary side controller 210, in accordance with some embodiments, are shown in FIG. 4. Some elements and signals of the primary side controller 210 have been omitted from FIG. 4 to simplify the description of the primary side controller 210 but are understood to be present. In general, the primary side controller 210 includes a PWM ramp generator ("PWM Ramp Gen.") 402, an analog to digital converter (ADC) module 404, a power optimization controller 406, a fractional valley controller 408, a zero-crossing detector (ZCD) 410, and other modules 412, coupled as shown. In some embodiments, the other modules 412 include other digital and/or analog modules of the primary side controller 210, such as additional control circuitry, one or more processors (e.g., microcontrollers, microprocessors, DSPs, ASICs, FPGAs), volatile data storage, non-volatile data storage, communication modules, or still other components. In some embodiments, one or more components of the other modules 412 may be in signal communication with one or more of the described components of the primary side controller 210 and/or with other components of the power converter 200.

The ADC module 404 is configured to generate a digitized feedback signal $t_{on}(n)$ based on the feedback signal $t_{on}$ (the desired on-time of the main switch M1). The ADC module 404 is further configured to generate a digitized input voltage $V_{in}(n)$ based on the conditioned input voltage $V_{in}$. In some embodiments, the power optimization controller 406 generates a desired off time $t_{off}^*(n)$ of the main switch M1 as described in related application, U.S. patent application Ser. No. 16/020,496. The ZCD 410 generates a valley detection signal valley$_{det}$ for each detected valley (e.g., the valleys 304a-c). In some embodiments, the ZCD 410 detects each of the valleys of the resonant waveform at the drain node of the main switch M1 using the auxiliary voltage $V_{aux}$ generated using the auxiliary winding 216. In other embodiments, the ZCD 410 detects each of the valleys of the resonant waveform at the drain node of the main switch M1 using a voltage received from, or based on the voltage at, the drain node of the main switch M1. The fractional valley controller 408 is configured to receive the valley detection signal valley$_{det}$, a measured off-time $t_{off}(n)$ of the main switch M1, a switching cycle frequency signal $t_{sw}(n)$ (a value representative of the switching period or switching frequency of the main switch M1), and a desired off-time $t_{off}^*(n)$ for the main switch M1 from the power optimization controller 406. The desired off-time $t_{off}^*(n)$ is a calculated off-time of the main switch M1 which corresponds to a total power to be delivered to the load $R_L$. As described earlier, in some instances the desired off-time $t_{off}^*(n)$ of the main switch M1 corresponds to a non-integer number of valleys. The fractional valley controller 408 is configured to modulate the off-time $t_{off}(n)$ of the main switch M1 between a series of modulated off-times. A modulated off-time is an off-time of the main switch M1 that differs in time as compared to one or more other off-times in the series of modulated off-times. That is, in the series of modulated off-times, a first modulated off-time may have a duration of t, a second modulated off-time may have a duration of t+τ, a third modulated off-time may also have a duration of t+τ, a fourth modulated off-time may have a duration of t . . . , and so on, where τ is a delay.

Each of the modulated off-times corresponds to an integer number of valleys of the resonant waveform at the drain node of the main switch M1. However, an average value of the modulated off-times of the main switch M1 converges to an average off-time of the main switch M1 that corresponds to a non-integer number of valleys. Thus, the fractional valley controller 408 advantageously switches the main switch M1 at points where the drain-source voltage $V_{dsM1}$ of the main switch M1 is minimized, but the total power delivered to the load $R_L$ is equal to a total power that corresponds to a non-integer number of valleys. The fractional valley controller 408 causes the main switch M1 to switch in accordance with the modulated off-times of the main switch M1 by transmitting a reset signal, $PWM_{reset}$, to the PWM ramp generator 402 when a number of valleys detected using the ZCD 410 exceeds a target number of valleys determined by the fractional valley controller 408.

Figure 5:
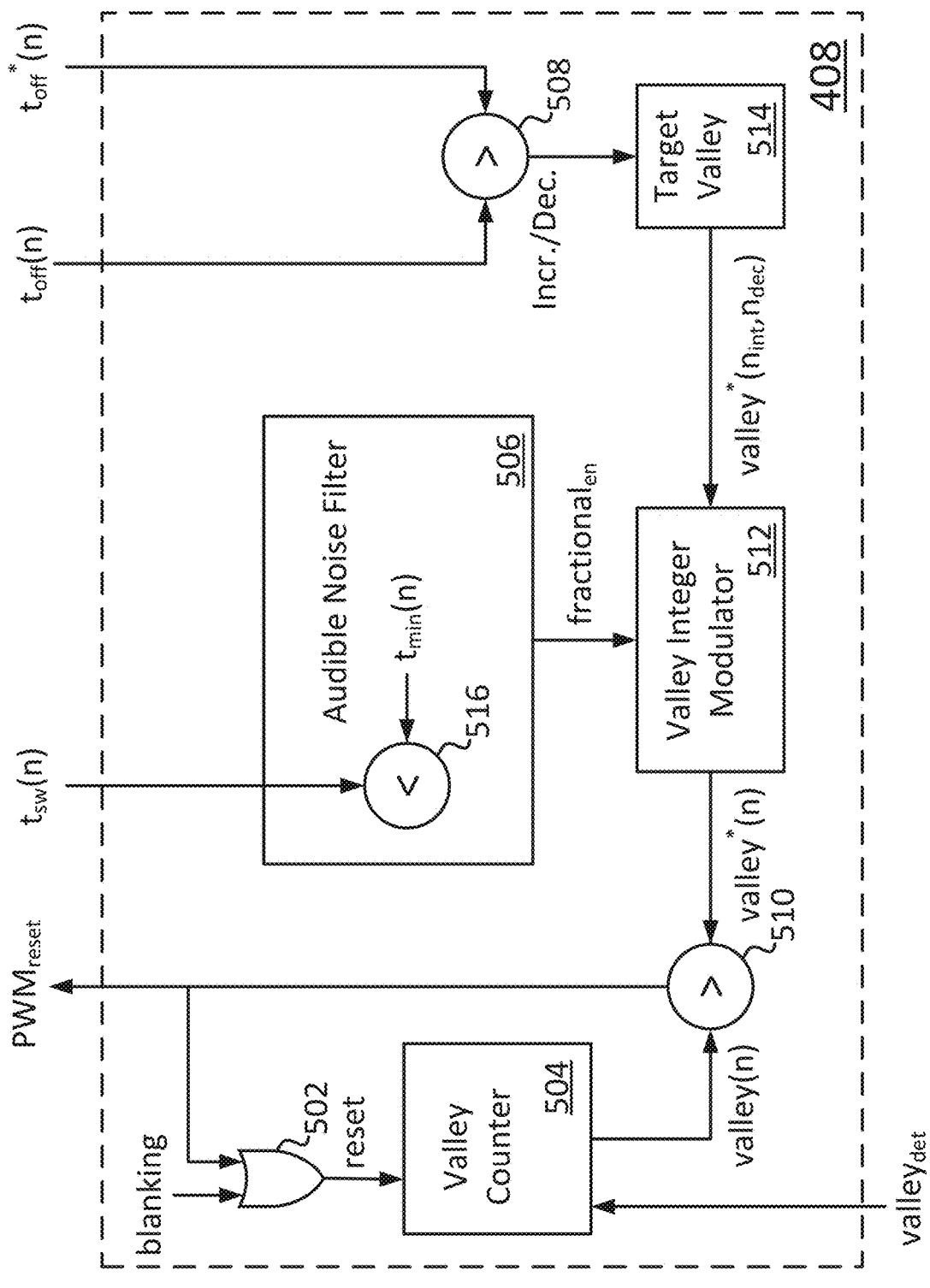
FIG. 5 is a simplified schematic of a fractional valley controller of the primary side controller shown in FIG. 4, in accordance with some embodiments.

A simplified schematic of the fractional valley controller 408, in accordance with some embodiments, is shown in FIG. 5. Some elements of the fractional valley controller 408 have been omitted from FIG. 5 to simplify the description of the fractional valley controller 408 but are understood to be present. In general, the fractional valley controller 408 includes an OR gate 502, a valley counter 504, an audible noise filter 506, a first signal comparison block 508, a second signal comparison block 510, a valley integer modulator 512, and a target valley generator 514. The audible noise filter 506 generally includes a third signal comparison block 516.

The first signal comparison block 508 is configured to receive the measured off-time $t_{off}(n)$ of the main switch M1 and the desired off-time $t_{off}*(n)$ of the main switch M1 and to generate an off-time adjustment signal ("Incr./Dec."). The first signal comparison block 508 compares the measured off-time $t_{off}(n)$ to the desired off-time $t_{off}*(n)$. If the measured off-time $t_{off}(n)$ is greater than the desired off-time $t_{off}*(n)$, the first signal comparison block 508 generates a decrement off-time adjustment signal which indicates that the main switch M1 should be switched at a point in time that corresponds to an earlier valley than that at which the main switch M1 is currently being switched. If the measured off-time $t_{off}(n)$ is not greater than the desired off-time $t_{off}*(n)$, the first signal comparison block 508 generates an increment off-time adjustment signal which indicates that the main switch M1 should be switched at a point in time that corresponds to a later valley than that at which the main switch M1 is currently being switched.

The target valley generator 514 receives the off-time adjustment signals ("Incr./Dec.") from the first signal comparison block 508 and generates a target valley number, valley*($n_{int}$, $n_{dec}$), having an integer portion (i.e., $n_{int}$) and a decimal portion (i.e., $n_{dec}$). For instance, if the target valley number is 2.65, the integer portion corresponds to the integer value 2, and the decimal portion corresponds to the decimal value 0.65. However, the target valley number is not limited to only corresponding to non-integer numbers of valleys. For example, for some desired off-times $t_{off}*(n)$ of the main switch M1, the target valley number may have a decimal portion that is equal to zero.

The valley integer modulator 512 is configured to receive the target valley number, valley*($n_{int}$, $n_{dec}$), and to generate a series of modulated integer valley numbers valley*(n). A modulated integer valley number is a valley number that differs in number as compared to one or more other valley numbers in the series of modulated integer valley numbers. That is, in the series of modulated integer valley numbers, a first modulated integer valley number may be 1, a second modulated integer valley number may be 2, a third modulated integer valley number may also be 2, a fourth modulated valley integer number may be 1 . . . , and so on. Advantageously, in some embodiments, the valley integer modulator 512 is configured to generate non-alternating sequences of modulated integer valley numbers. An example of an alternating sequence of integer valley numbers is {1, 2, 1, 2, 1, 2, . . . }. An example of a non-alternating sequence of integer valley numbers is {1, 2, 2, 2, 1, 2, 2, 2, . . . }. That is, the fractional valley controller 208 is configured to generate a first sequence of one or more first integer valley numbers in series immediately followed by a second sequence of one or more second integer valley numbers in series, where a length of the first sequence is different than a length of the second sequence, and the one or more first integer valley numbers are not equal to the one or more second integer valley numbers.

Each of the modulated integer valley numbers valley*(n) corresponds to a modulated off-time of the main switch M1. Thus, the series of modulated integer valley numbers, valley*(n), converge on an average valley number that is equal to, or close to equal to (i.e., "about"), the target valley number which is a non-integer valley number.

The valley counter 504 receives the valley$_{det}$ signal from the ZCD 410 and increments an internal counter to generate a detected valley count, valley(n). The second signal comparison block 510 compares a most recent detected valley count, valley(n), to a most recent modulated integer valley number, valley*(n). Upon determining that the most recent detected valley count, valley(n), is greater than the most recent modulated integer valley number, valley*(n), the second signal comparison block 510 transmits a $PWM_{reset}$ signal to the OR gate 502 and to the PWM ramp generator 402. Upon receiving the $PWM_{reset}$ signal, the PWM ramp generator 402 transmits a main switch control signal $PWM_{M1}$ at a level that enables the main switch M1. Thus, the main switch M1 is advantageously switched at a point in time that corresponds to an integer valley number even though the output power of the power converter 200 converges to a power corresponding to a non-integer valley number.

The OR gate 502 transmits a reset signal to the valley counter 504 upon receiving the $PWM_{reset}$ signal. Upon receiving the reset signal, the valley counter 504 resets the internal valley count value to an initial value (e.g., 0). Additionally, the OR gate 502 transmits the reset signal to the valley counter 504 upon receiving a blanking signal (e.g., during a time when the main switch M1 is not disabled).

The valley integer modulator 512 is advantageously configured to only perform fractional valley switching when a switching frequency of the main switch M1 is higher than a minimum frequency threshold such that the modulated off-times of the main switch M1 will not generate frequencies that are in the range of audible noise (e.g., equal to or less than 30 kHz). The audible noise filter 506 receives the measured switching cycle frequency signal $t_{sw}(n)$ from the PWM ramp generator 402 and receives a minimum switching cycle frequency threshold $t_{min}(n)$ (e.g., from a processor or other component of the other modules 412, or from another source such as a configuration component of the power converter 200). Upon determining that the measured switching cycle frequency signal $t_{sw}(n)$ is less than the minimum switching cycle frequency threshold $t_{min}(n)$, the third signal comparison block 516 sends a de-asserted fractional$_{en}$ signal to the valley integer modulator 512 to disable fractional valley switching. Upon determining that the measured switching cycle frequency signal $t_{sw}(n)$ is not less than the minimum switching cycle frequency threshold $t_{min}(n)$, the third signal comparison block 516 sends an asserted fractional$_{en}$ signal to the valley integer modulator 512 to enable fractional valley switching. Thus, fractional valley switching is advantageously disabled if fractional valley switching would result in undesirable audible tones.

Figure 6:
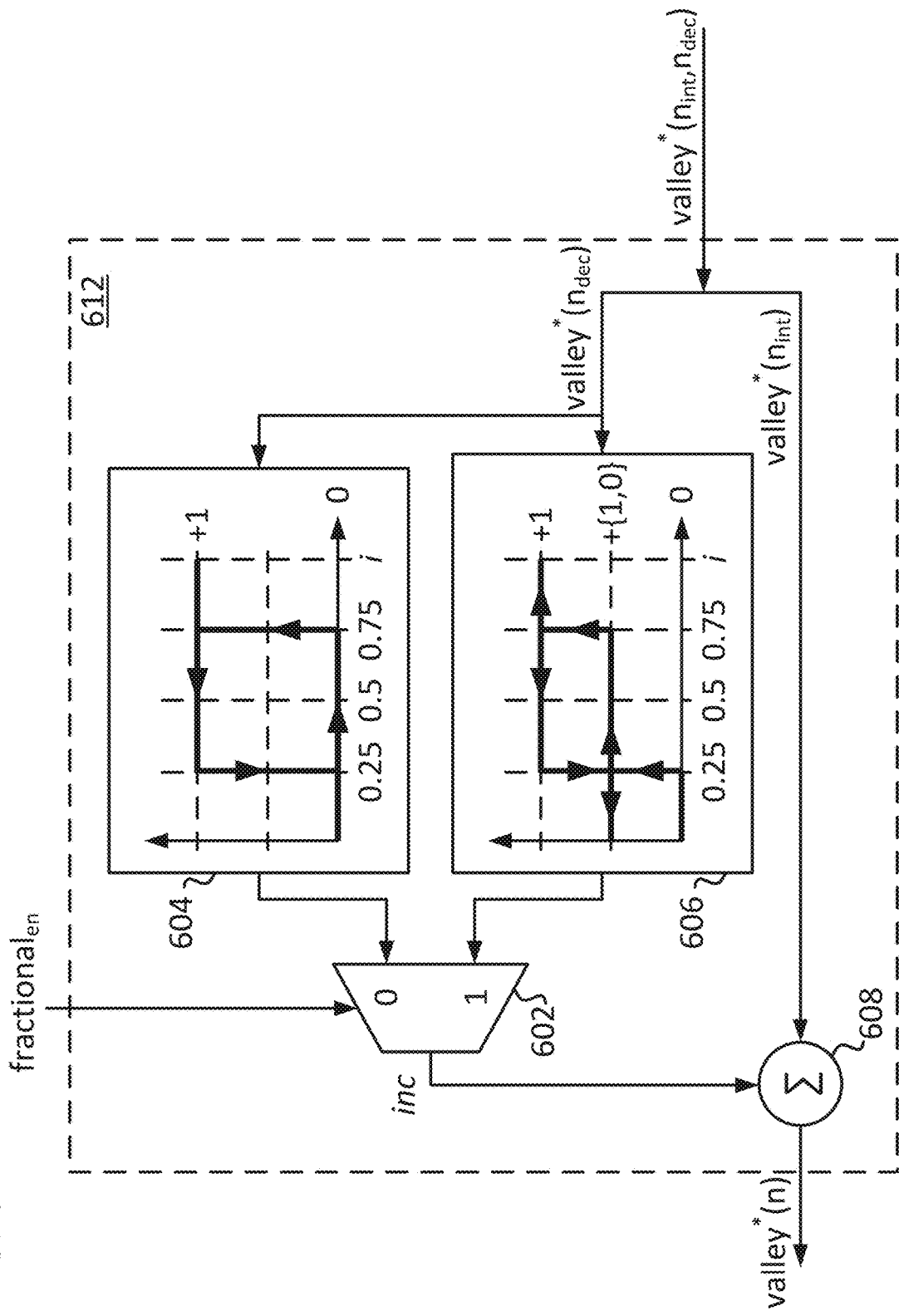
FIGS. 6-7 are simplified schematics of valley integer modulators of the fractional valley controller shown in FIG. 5, in accordance with some embodiments.

FIG. 6 is a simplified schematic of an example valley integer modulator 612 that implements the valley integer modulator 512, in accordance with some embodiments. The valley integer modulator 612 is suitable for switching cycle frequencies $t_{sw}(n)$ that are greater than 60 kHz due to generated tones which are in some instances one-half of the switching cycle frequency $t_{sw}(n)$. Some elements of the valley integer modulator 612 have been omitted from FIG. 6 to simplify the description of the valley integer modulator 612 but are understood to be present. The valley integer modulator 612 generally includes a mux 602 (i.e., a component that receives two or more input signals and selectively passes one of the two or more input signals to an output of the mux), a first modulator 604, a second modulator 606, and a signal adder block 608. The mux 602 receives the fractional$_{en}$ signal from the audible noise filter 506. If the fractional$_{en}$ signal is de-asserted, the mux 602 passes an output from the first modulator 604 to the signal adder block 608. If the fractional$_{en}$ signal is asserted, the mux 602 passes an output from the second modulator 606 to the signal adder block 608. In some embodiments, the first modulator 604 generates an output with hysteresis such that the output, inc, of the mux 602 transitions to 1 if the decimal portion, valley*($n_{dec}$), is greater than or equal to 0.75 for a given initial output of 0. In such embodiments, the first modulator 604 generates an output with hysteresis generally such that the output, inc, of the mux 602 transitions to 0 if the decimal portion, valley*($n_{dec}$), is less than or equal to 0.25 for a given initial output of 1. When fractional valley switching is disabled, output ripple of the power converter 200 may increase as compared to output ripple when fractional valley switching is enabled.

In some embodiments, the second modulator 606 generates an output using a different hysteresis than that of the first modulator 604. In such embodiments, the second modulator 606 generates an output that modulates between 1 and 0 based the decimal portion, valley*($n_{dec}$) of the target valley number, valley*($n_{int}$, $n_{dec}$). That is, for a range of decimal values that, in contrast, corresponds to a dead-band of the first modulator 604, the second modulator 606 generates a stream of values that modulate between 0 and 1.

The output, inc, of the mux 602 is summed with the integer portion valley*($n_{int}$) of the target valley number valley*($n_{int}$, $n_{dec}$) by the signal adder block 608, thereby generating the stream of modulated output valley numbers, valley*(n).

Figure 7:
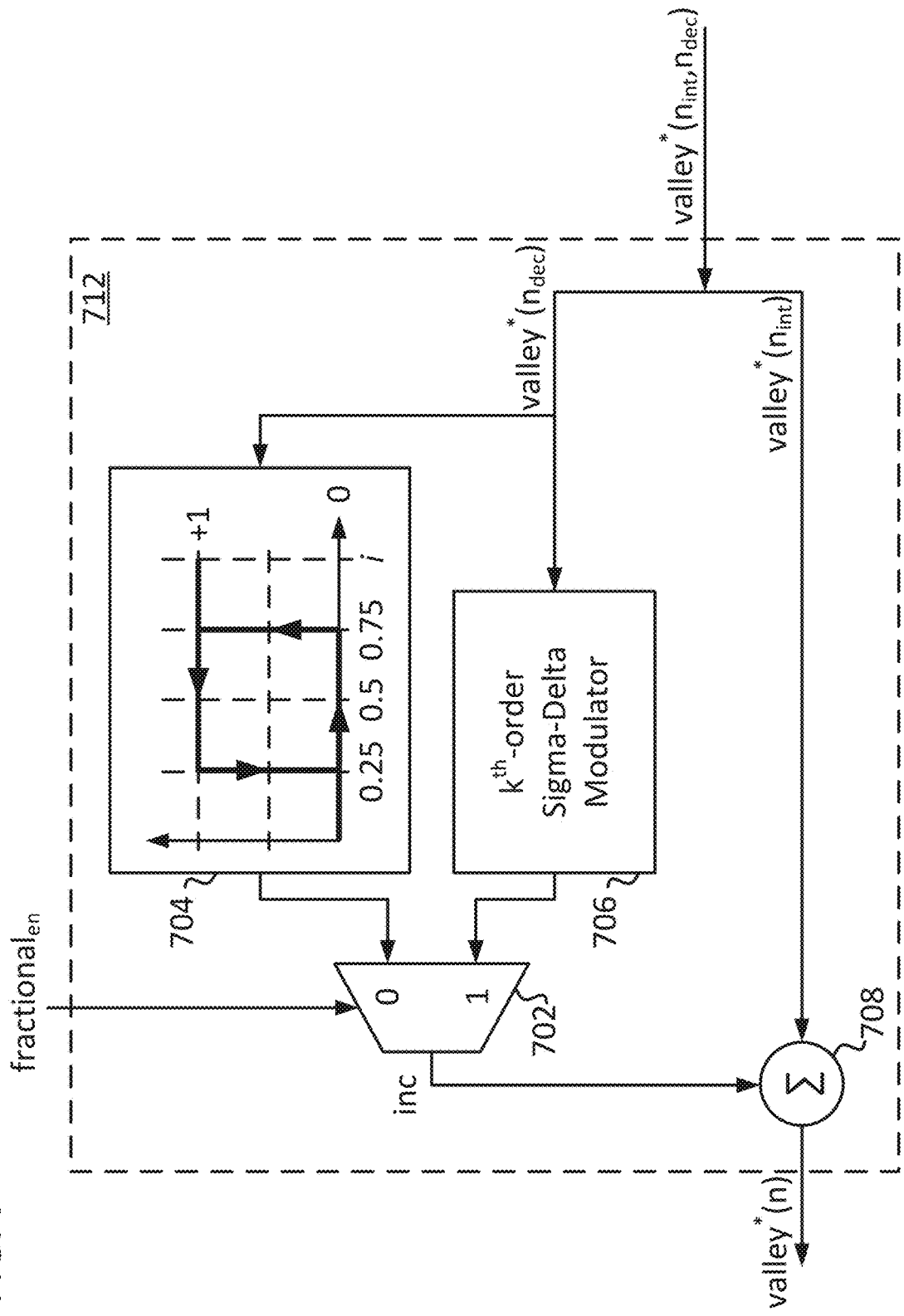

FIG. 7 is a simplified schematic of another example valley integer modulator 712 that implements the valley integer modulator 512, in accordance with some embodiments. The valley integer modulator 712 is suitable for switching cycle frequencies $t_{sw}(n)$ that are greater than 250 kHz due to low-frequency tones that are generated in some instances by a $k^{th}$-order sigma-delta modulator implemented by a second modulator 706. Some elements of the valley integer modulator 712 have been omitted from FIG. 7 to simplify the description of the valley integer modulator 712 but are understood to be present. The valley integer modulator 712 generally includes a mux 702, a first modulator 704, the second modulator 706, and a signal adder block 708. The mux 702 receives the fractional$_{en}$ signal from the audible noise filter 506. If the fractional$_{en}$ signal is de-asserted, the mux 702 generates an output, inc, using an output from the first modulator 704. The output, inc, for the mux 702 is received by the signal adder block 708. If the fractional$_{en}$ signal is asserted, the mux 702 generates the output, inc, using an output from the second modulator 706. In some embodiments, the first modulator 704 generates an output as described with reference to the first modulator 604 of FIG. 6.

The $k^{th}$-order sigma-delta modulator implemented by the second modulator 706 is configured to receive the decimal portion, valley*($n_{dec}$) of the target valley number valley* ($n_{int}$, $n_{dec}$) and to generate an output stream of "highs" and "lows" (i.e., 1's and 0's) based on the decimal portion, valley*($n_{dec}$). The sigma-delta modulator of the second modulator 706 generates an output stream of values such that a number of 1's in the output stream of values increases as a value of the decimal portion, valley*($n_{dec}$) increases. Similarly, the sigma-delta modulator of the second modulator 706 generates an output stream of values such that a number of 0's in the output stream of values increases as a value of the decimal portion, valley*($n_{dec}$) decreases. The order of the sigma-delta modulator of the second modulator 706 dictates the number of integrators, i.e., the number of feedback loops, utilized. The higher the order, the higher the achievable fractional valley resolution. The sigma-delta modulator of the second modulator 706 advantageously generates the output stream as a noise-shaped signal to achieve higher resolution of fractional valley switching with a predictive frequency content as compared to hysteresis-based approaches. For example, an example sequence of modulated integer valley numbers, valley*(n), generated by the valley integer modulator 712 could include a sequence such as {4, 2, 1, 2 . . . } which converges on a non-integer valley number of 2.25.

Figure 8:
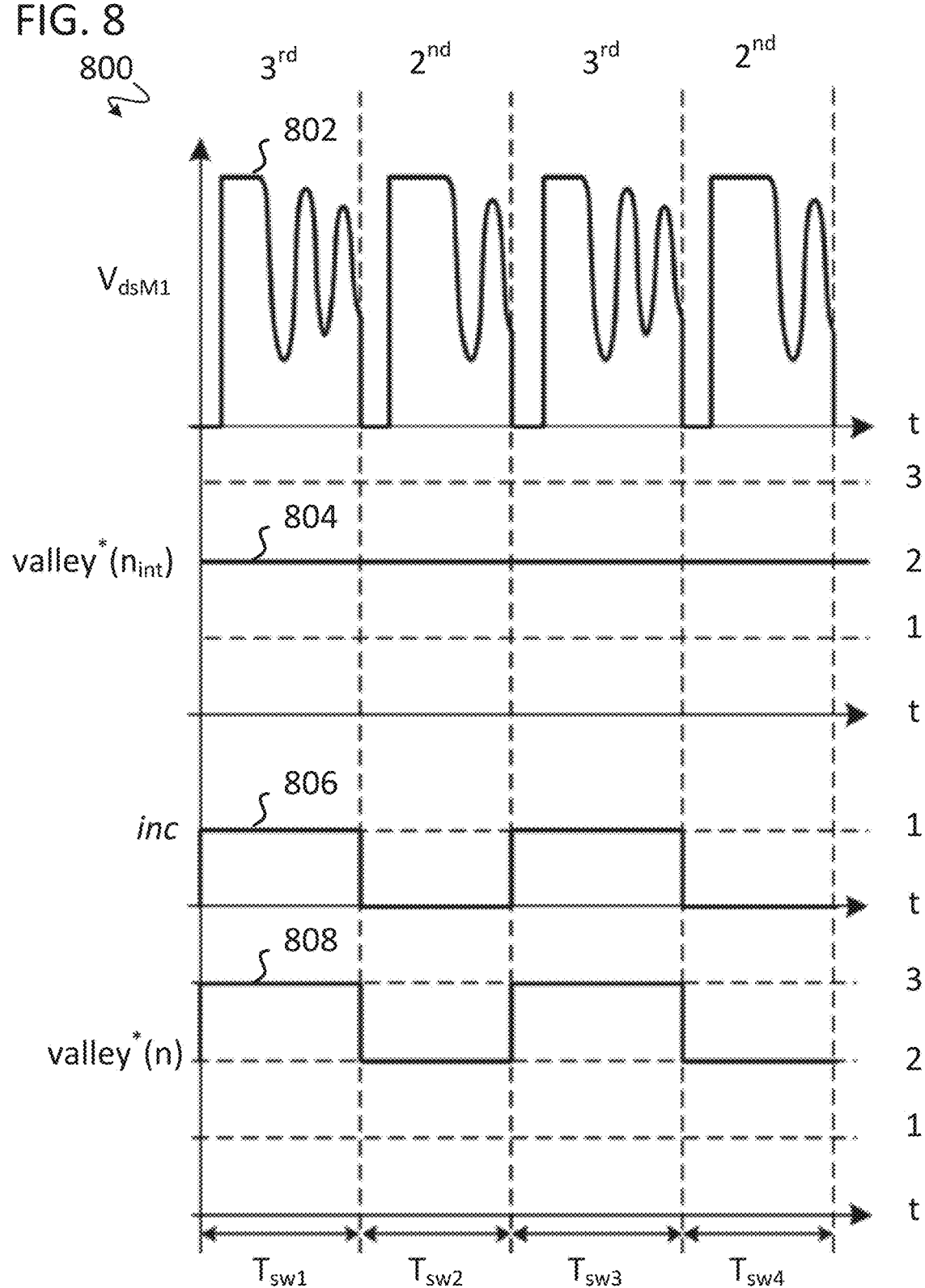
FIG. 8 is a simplified plot of signals related to the power converter shown in FIG. 2, in accordance with some embodiments.

FIG. 8 shows a simplified plot 800 of signals related to the power converter 200 indicating operation thereof, in accordance with some embodiments. The simplified plot 800 includes a plot 802 of the drain-source voltage $V_{dsM1}$ of the main switch M1 (i.e., a resonant waveform), a plot 804 of the integer portion valley*($n_{int}$) of the target valley number, valley*($n_{int}$, $n_{dec}$), a plot 806 of the output, inc, of the mux 602 or 702, and a plot 808 of a resultant modulated valley number, valley*(n). In the example shown in the simplified plot 800, an average valley number of the resonant waveform at the drain node of the main switch M1 converges on a non-integer valley number of 2.5.

Figure 9:
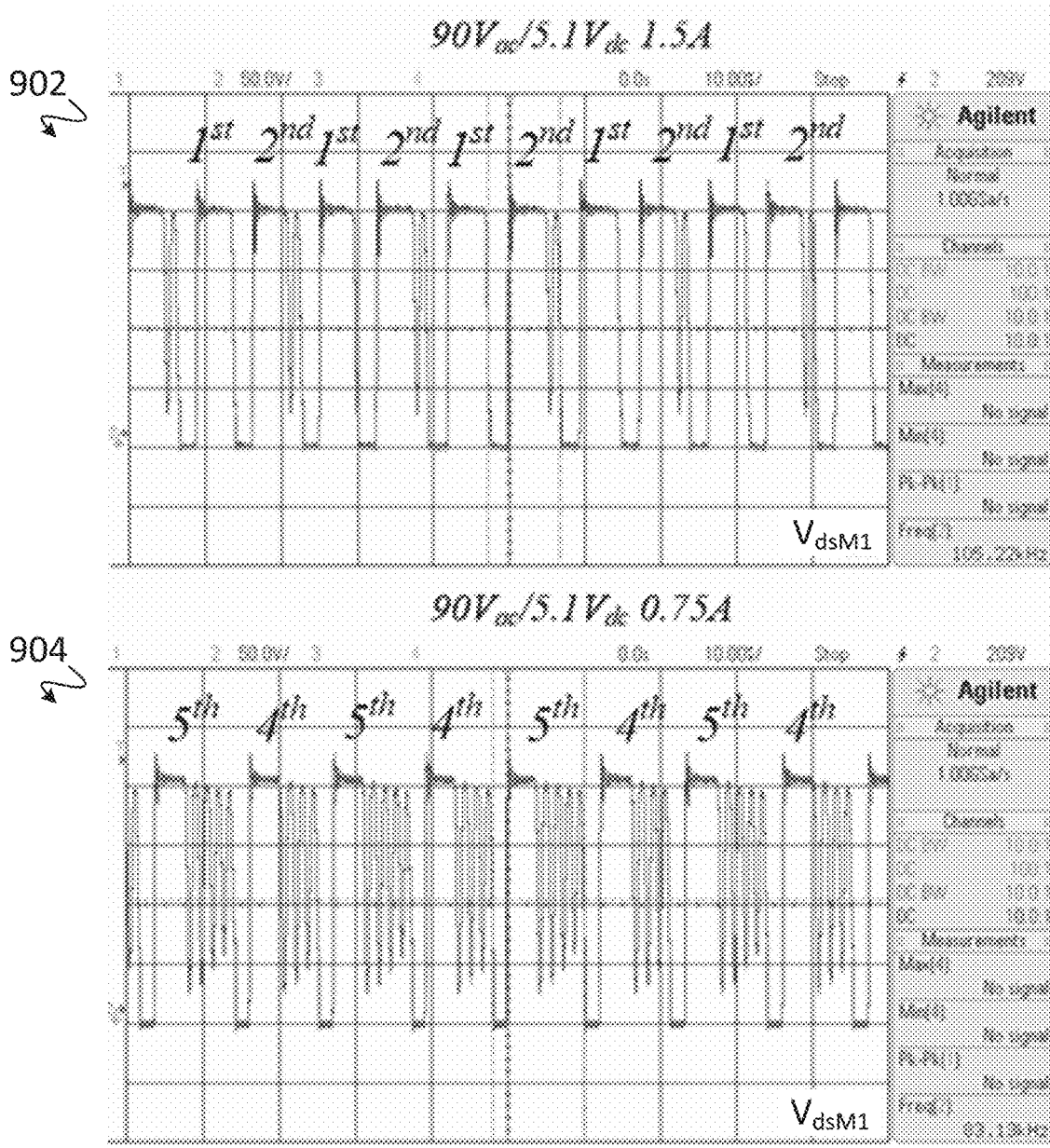
FIGS. 9-10 are screenshots of experimental results for a test power converter that is similar to the power converter shown in FIG. 2, in accordance with some embodiments.

FIG. 9 shows screenshots 902, 904 of experimental results for a test power converter that is similar to the power converter 200, in accordance with some embodiments. Each of the screenshots 902, 904 show a drain-source voltage $V_{dsM1}$ measurement of a main switch of the test power converter over time. The screenshot 902 illustrates fractional valley switching between a $1^{st}$ valley and $2^{nd}$ valley to achieve a 1.5 A output to a load of the test power converter.

The screenshot 904 illustrates fractional valley switching between a 4th valley and a 5th valley to achieve a 0.75 A output to the load of the test power converter.

Figure 10:
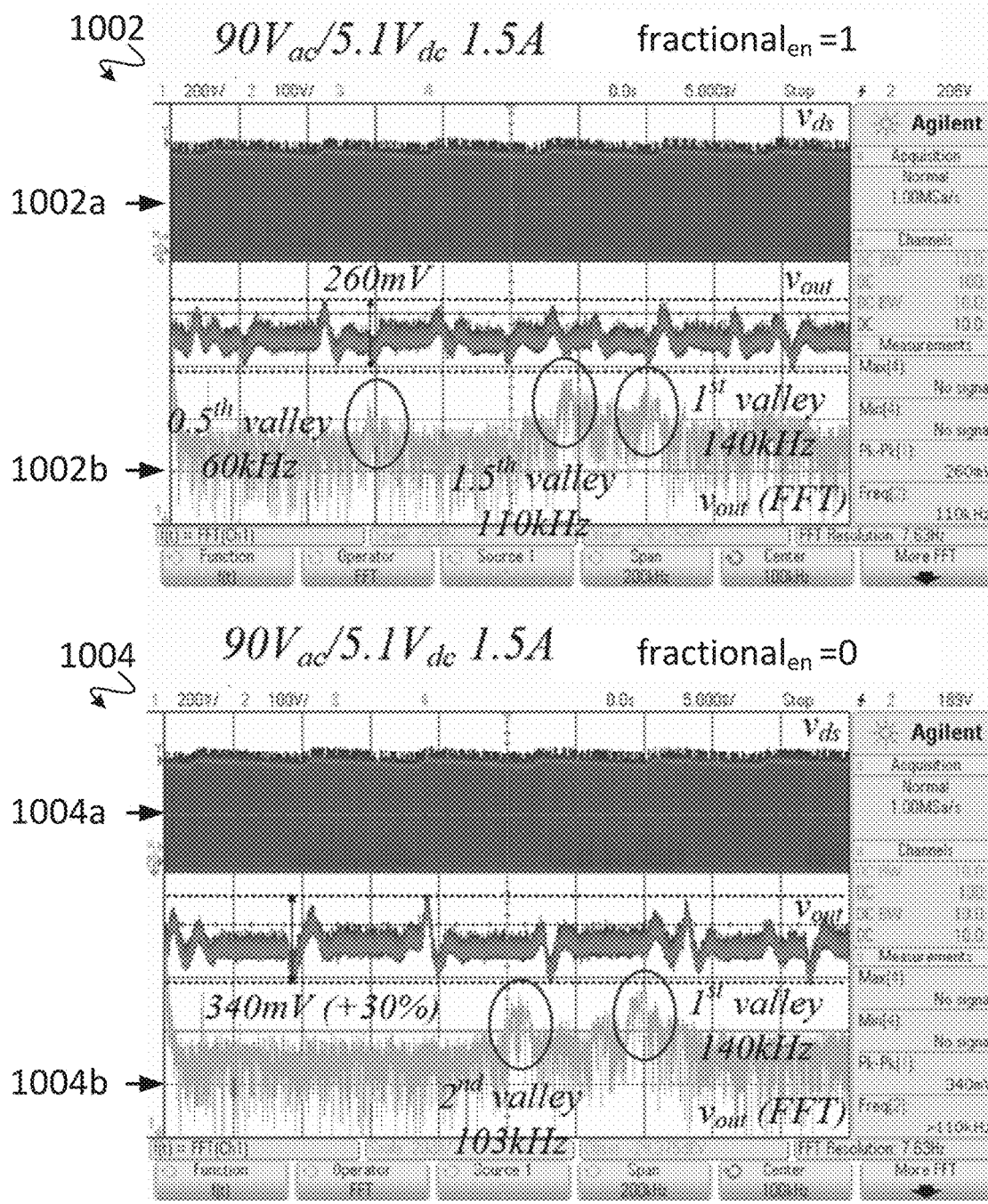

FIG. 10 shows screenshots 1002, 1004 of experimental results for a test power converter that is similar to the power converter 200, in accordance with some embodiments. Each of the screenshots 1002, 1004 show time (1002a/1004a) and frequency domain (1002b/1004b) measurements of a drain-source voltage $V_{dsM1}$ of a main switch of the test power converter. The screenshot 1002 illustrates the time and frequency domain measurements of $V_{dsM1}$ when fractional valley switching is enabled (i.e., fractional$_e$n=1), and the screenshot 1004 illustrates the time and frequency domain measurements of $V_{dsM1}$ when fractional valley switching is disabled (i.e., fractional$_e$n=0) for a 90 Vac/5.1 Vdc 1.5 A operating condition of the test power converter. As shown, the output voltage ripple of the test power converter is advantageously reduced from 340 mV to 260 mV when fractional valley switching is enabled. A 60 kHz frequency component is generated by the test power converter when fractional valley switching is enabled, however, the 60 kHz frequency component is outside of an audible noise range.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A power converter controller comprising:
   a fractional valley controller configured to determine a target number of valleys of a resonant waveform at a drain node of a main switch, the target number of valleys corresponding to a desired off-time of the main switch, the fractional valley controller modulating an off-time of the main switch between a plurality of modulated off-times;
   wherein:
   the target number of valleys corresponds to a non-integer number of valleys of the resonant waveform at the drain node of the main switch;
   each of the modulated off-times of the main switch corresponds to an integer number of valleys; and
   the plurality of modulated off-times of the main switch has an average value that corresponds to the desired off-time.

2. The power converter controller of claim 1, wherein:
   each modulated off-time of the plurality of modulated off-times corresponds to a respective modulated integer valley number of a plurality of modulated integer valley numbers;
   the plurality of modulated integer valley numbers comprises a first sequence of one or more first integer valley numbers in series immediately followed by a second sequence of one or more second integer valley numbers in series;
   a length of the first sequence is different than a length of the second sequence; and
   the one or more first integer valley numbers are not equal to the one or more second integer valley numbers.

3. The power converter controller of claim 1, further comprising:
   a target valley generator of the fractional valley controller configured to generate the target number of valleys based on a difference between the desired off-time of the main switch and a measured off-time of the main switch.

4. The power converter controller of claim 1, further comprising:
   a PWM ramp generator configured to control the main switch;
   a power optimization controller;
   an off-time comparison module of the fractional valley controller configured to i) receive a measurement of the off-time of the main switch from the PWM ramp generator, and ii) receive the desired off-time of the main switch from the power optimization controller, and to emit an off-time adjustment signal based on a difference between the measurement of the off-time and the desired off-time; and
   a target valley determination module of the fractional valley controller configured to receive the off-time adjustment signal and to generate the target number of valleys based on the off-time adjustment signal.

5. The power converter controller of claim 1, further comprising:
   an audible noise filter of the fractional valley controller configured to i) generate a fractional mode enable signal if a switching frequency of the main switch is greater than a threshold switching frequency, and ii) generate a fractional mode disable signal if the switching frequency of the main switch is not greater than the threshold switching frequency.

6. The power converter controller of claim 5, further comprising:
   a valley integer modulator of the fractional valley controller configured to generate a plurality of modulated integer valley numbers based on the target number of valleys, the valley integer modulator being configured to receive the fractional mode enable signal and the fractional mode disable signal.

7. The power converter controller of claim 6, wherein:
   the valley integer modulator is configured to generate the plurality of modulated integer valley numbers using a first modulator upon receiving the fractional mode disable signal; and
   the valley integer modulator is configured to generate the plurality of modulated integer valley numbers using a second modulator upon receiving the fractional mode enable signal.

8. The power converter controller of claim 7, wherein:
   the first modulator generates the plurality of modulated integer valley numbers using a hysteresis controller having two fixed levels.

9. The power converter controller of claim 7, wherein:
   the second modulator generates the plurality of modulated integer valley numbers using a hysteresis controller having a varying first level and a fixed second level.

10. The power converter controller of claim 7, wherein:
the second modulator generates the plurality of modulated integer valley numbers using a sigma-delta modulator.

11. A power converter comprising:
a transformer having a primary winding configured to receive an input voltage, and a secondary winding configured to provide an output voltage to a load;
a main switch coupled to the primary winding and configured to control a current through the primary winding to generate the output voltage, a resonant waveform at a drain node the main switch comprising one or more valleys during an off-time of the main switch; and
a primary side controller configured to control the main switch, the primary side controller comprising a fractional valley controller configured to control the off-time of the main switch;
wherein:
the fractional valley controller is configured to determine a target number of valleys corresponding to a desired off-time of the main switch, the target number of valleys corresponding to a non-integer number of valleys;
the fractional valley controller is configured to modulate the off-time of the main switch between a plurality of modulated off-times, each of the modulated off-times of the main switch corresponding to a respective integer number of valleys of the resonant waveform; and
the plurality of modulated off-times of the main switch has an average value that corresponds to the desired off-time.

12. The power converter of claim 11, wherein:
each modulated off-time of the plurality of modulated off-times corresponds to a respective modulated integer valley number of a plurality of modulated integer valley numbers;
the plurality of modulated integer valley numbers comprises a first sequence of one or more first integer valley numbers in series immediately followed by a second sequence of one or more second integer valley numbers in series;
a length of the first sequence is different than a length of the second sequence; and
the one or more first integer valley numbers are not equal to the one or more second integer valley numbers.

13. The power converter of claim 11, further comprising:
a valley detection circuit of the primary side controller configured to generate a valley detection signal for each valley of the one or more valleys; and
an auxiliary winding of the transformer coupled to the valley detection circuit and configured to provide an auxiliary voltage corresponding to the one or more valleys of the resonant waveform during the off-time of the main switch, the valley detection signal being generated based on the auxiliary voltage.

14. The power converter of claim 11, further comprising:
an off-time comparison module of the fractional valley controller configured to i) receive a measurement of the off-time of the main switch, and ii) receive the desired off-time of the main switch, and to emit an off-time adjustment signal based on a difference between the measurement of the off-time and the desired off-time; and a target valley determination module of the fractional valley controller configured to receive the off-time adjustment signal and to generate the target number of valleys based on the off-time adjustment signal.

15. The power converter of claim 11, further comprising:
a valley integer modulator of the fractional valley controller configured to receive the target number of valleys and to generate a plurality of modulated integer valley numbers based on the target number of valleys, each of the modulated integer valley numbers corresponding to a respective modulated off-time of the plurality of modulated off-times.

16. The power converter of claim 15, further comprising:
a valley detection circuit of the primary side controller configured to generate a valley detection signal for each valley of the one or more valleys;
a valley counter of the fractional valley controller configured to receive each of the valley detection signals and to increment a valley count upon receiving each of the valley detection signals; and
a valley count comparison block of the fractional valley controller configured to compare a most recent valley count to a most recent modulated valley number of the plurality of modulated integer valley numbers and to emit a PWM reset signal upon determining that the most recent valley count exceeds the most recent modulated valley number, the PWM reset signal controlling the off-time of the main switch.

17. The power converter of claim 15, further comprising:
an audible noise filter of the fractional valley controller configured to i) generate a fractional mode enable signal if a switching frequency of the main switch is greater than a threshold switching frequency, and ii) generate a fractional mode disable signal if the switching frequency of the main switch is not greater than the threshold switching frequency.

18. The power converter of claim 17, further comprising:
a first modulator of the valley integer modulator; and
a second modulator of the valley integer modulator;
wherein:
the valley integer modulator is configured to generate the plurality of modulated integer valley numbers using the first modulator upon receiving the fractional mode disable signal; and
the valley integer modulator is configured to generate the plurality of modulated integer valley numbers using the second modulator upon receiving the fractional mode enable signal.

19. The power converter of claim 18, wherein:
the first modulator generates the plurality of modulated integer valley numbers using a hysteresis controller having two fixed levels.

20. The power converter of claim 18, wherein:
the second modulator generates the plurality of modulated integer valley numbers using a hysteresis controller having a varying first level and a fixed second level.

21. The power converter of claim 18, wherein:
the second modulator generates the plurality of modulated integer valley numbers using a sigma-delta modulator.

* * * * *